United States Patent [19]

Wesson et al.

[11] Patent Number: 4,781,431
[45] Date of Patent: Nov. 1, 1988

[54] LENSED OPTICAL CONNECTOR

[75] Inventors: Laurence N. Wesson, Collegeville, Pa.; James F. Ryley, Haddonfield, N.J.

[73] Assignee: Labinal Components and Systems, Inc., Elk Grove Village, Ill.

[21] Appl. No.: 947,233

[22] Filed: Dec. 29, 1986

[51] Int. Cl.$^4$ .............................................. G02B 6/38
[52] U.S. Cl. ................................................. 350/96.21
[58] Field of Search ................. 350/96.18, 96.20, 96.21

[56] References Cited

U.S. PATENT DOCUMENTS

| 3,166,623 | 1/1965 | Waidelich | 88/1 |
|---|---|---|---|
| 3,492,058 | 1/1970 | Waldman | 350/2 |
| 3,517,981 | 6/1970 | Rueger | 350/96.10 |
| 3,572,891 | 3/1971 | Longenecker | 350/96.20 |
| 3,637,284 | 1/1972 | Plyler | 350/96.20 |
| 3,982,060 | 9/1976 | Avery et al. | 174/75 |
| 4,060,309 | 11/1971 | Le Noane et al. | 350/96.18 |
| 4,076,376 | 2/1978 | Slaughter | 350/96.21 |
| 4,119,362 | 10/1978 | Holzman | 350/96.18 |
| 4,185,883 | 1/1980 | Chown et al. | 350/96.20 |
| 4,190,316 | 2/1980 | Malsby et al. | 350/96.18 |
| 4,257,672 | 3/1981 | Balliet | 350/96.17 |
| 4,265,511 | 5/1981 | Nicia et al. | 350/96.20 |
| 4,304,461 | 12/1981 | Stewart et al. | 350/96.18 |
| 4,327,963 | 5/1982 | Khoe et al. | 350/96.18 |
| 4,371,233 | 2/1983 | Masuda | 350/96.18 |
| 4,421,383 | 12/1983 | Carlsen | 350/96.18 X |
| 4,440,470 | 4/1984 | Khoe | 350/96.18 X |
| 4,451,115 | 5/1984 | Nicia et al. | 350/96.18 |
| 4,468,087 | 8/1984 | Milan et al. | 350/96.18 |
| 4,632,505 | 12/1986 | Allsworth | 350/96.18 X |
| 4,639,076 | 1/1987 | Mikolaicyk et al. | 350/96.18 X |

OTHER PUBLICATIONS

Glass Sphere Lenses for Better Coupling, Norman Nager, Sep. 1983, *Photonics Spectra*, 52–56.
Optical Contacts, David W. Welsh and Popper, *Proceedings of the Fourteenth Annual Group*, Philadelphia, Nov. 14, 1983.

*Primary Examiner*—William L. Sikes
*Assistant Examiner*—Akm E. Ullah
*Attorney, Agent, or Firm*—Neuman, Williams, Anderson & Olson

[57] ABSTRACT

A low light loss expanded beam fiber optic connection is provided comprising lensed optical connector pins. Each connector pin employs a cylindrical housing in which a fiber end is precisely located along a longitudinal axis in precisely spaced relationship with an adjacent ball lens. The center of the ball lens is coaxial with the longitudinal axis of the optical fiber core and is maintained in such precisely spaced relationship by means of a spacer engaging the ball lens and the fiber end on opposed surfaces. As a result of the precise relationship, light emanating from a fiber end is disposed at the focal point of the adjacent ball lens for transmission to an adjacent, axially aligned lensed optical connector pin of similar construction.

23 Claims, 2 Drawing Sheets

LENSED OPTICAL CONNECTOR

BACKGROUND

This invention relates to a lensed optical connector pin, and more specifically pertains to a lowloss, expanded-beam, fiber optic interconnection having readily cleanable optical faces on the pins effecting an optical connection. The use of rugged fiber couplings effected by SMA-style single-fiber connectors is well known in the art. Such connectors typically employ a bare optic fiber end which is potted with epoxy resin in a precision ferrule. The end of the optic fiber is polished down until a flat, smooth surface is formed with the fiber end flush with the end of the ferrule in which disposed.

Such constructions are subject to well known problems relating to light loss resulting from fiber misalignment in the mating pins. In addition, the small areas defined by the fiber ends which effect light transfer are highly susceptible to dirt contamination and resulting light loss. Such problems arise because the mating regions of the two fibers effecting an interconnection are typically only fifty microns in diameter when multimode fibers are employed, and as small as eight microns in diameter when employing single-mode fibers. Also, the well known "pot-and-polish" procedures employed in formation of butt joints by opposing contacts introduce problems of messiness, and require lengthy and costly assembly time, even when a skilled technician performs the contact-forming steps.

The shortcomings of fiber butt joints are well known in the prior art and discussed in the article "Glass Sphere Lenses for Better Coupling" by Norman Nager appearing in the September, 1983, issue of *Photonics Spectra*, pages 52 through 56. This article discusses the advantages of employing an optical connector utilizing precision spheres rather than a butt joint between fiber ends. In this article, the large light losses and resulting inefficiency of light transfer are noted when the fiber ends defining the butt joint are axially misaligned, have their end faces tilted relative to each other, or are spaced apart so as to leave an intervening gap.

However, when spheres are employed in conjunction with the fiber ends to interface such ends in a fiber optic connection, a beam is developed in one sphere and transferred to a second sphere for passage to an adjoining fiber. The total light insertion loss is typically of the order of 0.70 dB to 1.5 dB, well within accepted light loss levels. This manner of achieving an optical interconnection may be contrasted with the butt coupling method, wherein losses are far more sensitive to fiber end offset in the xy plane. Such xy plane fiber offsets cause optical losses to increase at a rate approximately 5 to 10 times greater than is the case for lensed termination lateral offsets. In addition, fiber misalignments in the Z direction of only 0.001 to 0.005 inch can cause significant light losses in butt joints, whereas lensed terminations can tolerate variations in separation from 0 to 0.1 inch without serious light losses. It is also known that in butt-type connections, light transfer utilizing single mode fibers is especially inefficient as extremely accurate alignment of the small-diameter fiber cores is required.

In a paper entitled "Optical Contacts", by David E. Welsh and Paul Popper, presented at the Proceedings Of The Fourteenth Annual Connector Group in Philadelphia on Nov. 14, 1983, fiber optic contacts employing ball lenses are disclosed for utilization in SMA type connectors as well as in multi-contact MIL-C-38999 connectors. The prior art has recognized the advantages of ball lenses in the formation of light-transmissive connections as compared to butt joints in patents such as Stewart, et al., U.S. Pat. No. 4,304,461. This patent discloses the utilization of fiber wave guides mounted in precision ferrules which are disposed adjacent ball lenses for purposes of effecting light transfer from one fiber end to another. In accordance with the teachings of the Stewart, et al. patent, a spherical lens is fitted into a recess in a precision ferrule which also serves to align the end of a fiber wave guide at the center of the sphere lens. The ball lenses to be employed in accordance with the teachings of this patent have a refractive index between 1.9 and 2.1. If in fact a ball lens has a refractive index within this desired range, the fiber end contacts the ball lens and is epoxied in place. If, however, the refractive index of the ball lens is of the order of 1.78, a suggestion is made that the fiber end should be spaced from the surface of the sphere lens. There is no disclosure whatsoever as to how such spacing can be effected or is possible utilizing the fiber jewels disclosed. In the structure of the Stewart, et al. connector, a ball lens is located in a recess in a fiberguiding precision furrule.

Other prior art references disclosing the use of ball lenses for purposes of effecting a light transmissive connection comprise Khoe, U.S. Pat. No. 4,440,470, in which a transparent coupling material is located between a fiber end and its associated spherical lens. The coupling material has a flat face which is utilized for purposes of preventing reflection at the interface of the lens and fiber. The refractive index of the coupling material is preferably the same as the refractive index of the fiber core.

The utilization of a spherical lens spaced from a fiber end so as to locate the fiber end at the focus of the spherical lens is disclosed in Milan, et al. U.S. Pat. No. 4,468,087.

Nicia, et al., U.S. Pat. No. 4,451,115 discloses a connector employing ball lenses clamped in seats. This patent also discloses shaped fiber holders for adjusting the axial interval of the fiber holders within the housing, and adjusting the fiber ends at the correct distances from the spherical lenses. The Nicia patent requires an adjustment for proper fiber end-ball lens interval. The structure disclosed in Nicia is quite unlike that employed by applicants as it is much more expensive in view of the multiplicity of components. The Nicia structure does not suggest a precise optical pin connector construction which is ready for use merely by performing the steps of assembly, as does applicants' construction.

Masuda, U.S. Pat. No. 4,371,233, also discloses an optical fiber connector employing ball lenses in which the optical fibers are arranged relative to the ball lenses so that the light emitted from one optical fiber is diverged in parallel by one lens. The light is converged again by the other ball lens for focusing at the end surface of the light-receiving optical fiber. The lenses in Masuda are adjustably positionable for desired relation relative to the optical fiber ends. The structure in Masuda suggests nothing of applicants' optical pin.

Khoe, et al., U.S. Pat. No. 4,327,963 is of interest in that it discloses utilization of a transparent coupling medium between a ball lens and entrance surface of a fiber so that reflections of the light passing therebetween is avoided.

Nicia, et al., U.S. Pat. No. 4,265,511 is of interest for its disclosure of a connector employing ball lenses in which the axes of the fibers may be adjusted parallel to the housing tubes in which disposed for minimizing light loss.

SUMMARY OF THE INVENTION

In accordance with this invention therefore, it is an object to provide a low-loss, low-cost, expanded-beam fiber optic interconnection by means of ball-lens contacts.

In applicant's construction, a fiber-guiding precision ferrule has a flat end, resulting in a less expensive construction, and both the ferrule and ball lens in applicants' construction are longitudinally aligned in a common pin housing. Desirably in the Stewart et al. construction, the fiber end makes contact with the ball lens and is epoxied in place. Such structure is in fact the claimed invention. In accordance with the invention of this application, the optic fiber or optical wave-guide end is separated from the ball lens by means of a precision spacer plate.

Also, in accordance with the invention of this application, the precision spacer plate is appropriately apertured so as to allow passage of the light passing between the fiber and the ball lens without traversing any thickness of the spacer plate. As a result, Fresnel losses which would result from the passage of light into the medium of the spacer plate are avoided.

In the provided invention of this application, the ball lens employed in the contacts and connectors employing the same are made from glasses having relatively low indices of refraction of less than 2. Such glasses are normally harder than the higher index glasses, less expensive, and because of their increased hardness, easier to polish and more resistant to moisture and dirt attack. Such resistance avoids or minimizes undesired lens abrasion and associated light loss.

By means of the invention of this application, spaced ball lenses effecting a light transmissive connection and disposed in adjacent connector pins are precisely formed within extremely fine tolerances of a uniform lens material of composition having a precise index of refraction. The ball lenses are precisely located at spaced intervals relative to fiber ends whereby the light emanating from one fiber end may enter the adjacent ball lens at its focal point. The light is then transmitted from the first light-receiving ball lens to the adjacent ball lens for resulting transfer to the spaced fiber end in the adjacent pin. The light-receiving fiber end is located at the focal point of the second ball lens. As a result, the light transfer is highly efficient, with light losses not in excess of 0.6 dB. As above noted, the ball lenses made in accordance with this invention are formed of glasses which, although relatively low in cost, have desired wear and light-transfer characteristics.

It is another object of this invention to provide a pre-measured, novel, optic fiber contact construction which employs a spacer plate and ball lens assembled adjacent a fiber end so that the fiber end may be precisely located at the focal point of the ball lens by the mere act of assembly of the components in the contact. No subsequent adjustment of the lens-fiber end interval is necessary.

It is another object of this invention to provide an optical connector pin employing a ball lens which may be readily cleaned at periodic intervals by virtue of the non-permanent relationship between the contact and the housing therefor. The relatively large exposed ball lens area of the provided optical pins as compared to its associated fiber end renders cleaning a relatively easy matter in the provided connector, and minimizes light losses due to any dirt present on the relatively large surfaces of the ball lens.

It is another object of this invention to provide a lensed optical fiber contact which is miniature in size and employs desirably hard materials for lens formations which materials are readily polished and resistant to damage.

A further object of this invention is to provide a connector employing lensed connector pins which provide light losses on the order of 1.0–1.5 dB.

It is a further object of this invention to provide a novel optical fiber pin connector construction which provides for automatic fiber alignment and desired relationship relative to a ball lens by means of a precision jewel ferrule and spacer plate which assume their precise locations by the mere act of joining the various components in the normal course of contact assembly.

It is a further object of this invention to provide lensed optical connector pins which may be employed in standard electrical connectors, thereby having multiterminus capability in connector bodies already available, such as type MIL-C-38999.

By virtue of their ability to be employed in electrical connectors of the aforementioned type, the provided optical contact pins are readily adaptable for hybrid electrical/optical capabilities in their utilization with standard electrical connectors.

In accordance with one embodiment of this invention, a pin liner is inserted into a first end of a pin housing body in a press fit engagement, and axially located against a stop shoulder. The shoulder-engaging end of such liner is thus at a precise distance relative to the terminal ends of such pin body. A precise ferrule or precision jewel for guiding the end of an optical fiber along a predetermined longitudinal axis is then inserted into a second end of the pin body against the shoulderengaging end of the pin liner at a precise interval relative to the ends of the pin body. A precisely formed spacer plate is then inserted into the pin body over one end of the jewel ferrule. A ball lens is then butted against the precise spacer plate by insertion into the pin body, and secured in place relative to the pin body by crimping terminal end tines of the pin body over the ball lens.

In such structure, the ball lens will be spaced a precise interval from one end of the fiber guide ferrule so as to be located along the longitudinal axis of the fiber to be inserted into the jewel ferrule. On insertion of an optical fiber or wave guide into the pin liner and then into the jewel guide for abutment against the spacer plate, the fiber end will be located relative to the adjacent ball lens so as to be at the focal point thereof.

Adjacent optical fiber pins providing a light transmissive connection may be spaced apart approximately 0.02 of an inch in a tubular alignment guide or socket. A number of such sockets may be disposed in a connector of the type above mentioned, as will hereinafter be explained in greater detail. The outer protective coverings of the fibers may be crimped in place relative to the pin bodies in which disposed by having outer peripheral portions of the pin bodies inwardly crimped so as to deform the normally plastic coverings and interlock therewith. Heat may be employed during the crimping of the fiber coverings to minimize stresses on the light-conducting cores of the fibers.

DESCRIPTION OF THE DRAWINGS

For a more complete understanding of this invention, reference will now be made to the drawing, wherein.

DESCRIPTION OF THE INVENTION

Figure 1:
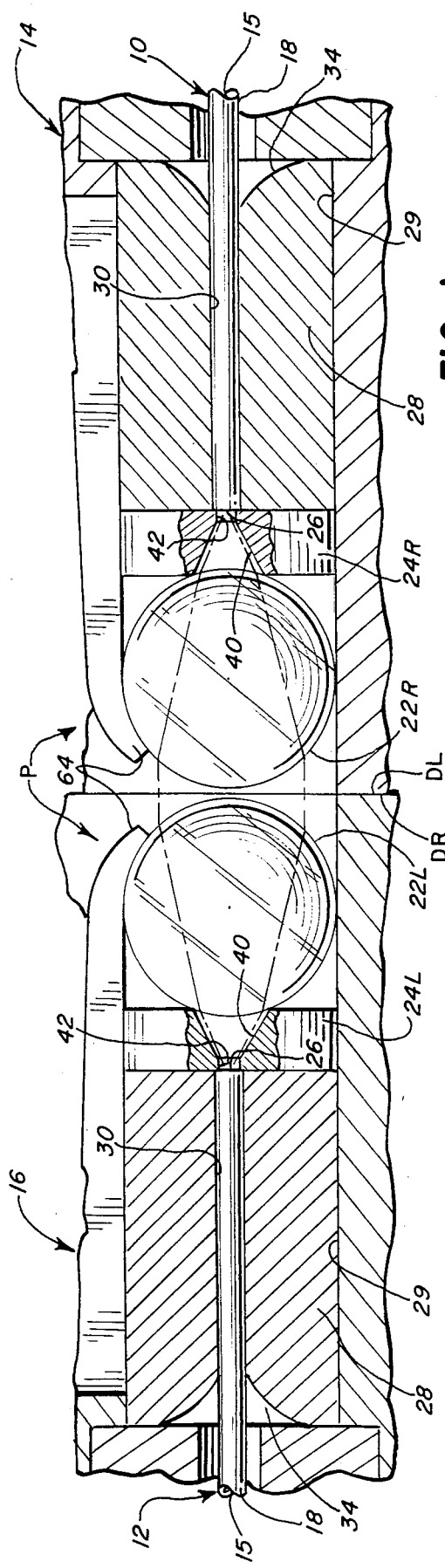
FIG. 1 is a fragmentary, longitudinal sectional view partly in elevation, illustrating end portions of optical pin contacts made in accordance with the teachings of this invention in a normal position of assembly for purposes of effecting a light transmissive connection. The elements of FIG. 1 are illustrated on a greatly enlarged scale.

Referring now more particularly to FIG. 1 of the drawing, optical fibers 10 and 12 adapted to engage in a light transmissive connection are illustrated, mounted in optical contact pin housings 14 and 16 respectively. Each of the fibers 10 and 12 comprises a central light transmitting core 15 about which is disposed an outer cladding 18. The fibers 10 and 12 may be of the step index type, or graded index type wherein the index of refraction varies throughout the cross section of the core 15.

It is the intention of this invention to provide an expanded beam fiber optic interconnection employing ball lenses for purposes of minimizing light losses occasioned by misalignment of the fiber axes and end surfaces. The provided optical interconnection is effected by means of ultra-miniature pins P fragmentarily illustrated in FIG. 1. Pins P comprise compact assemblies which may be readily mounted in an aligning sleeve such as sleeve 70 disposed in a multi-terminus connector 20 of FIG. 4.

In accordance with this invention, a low-cost optical interconnection is provided of high efficiency in which the light losses are in the nature of 1.0-1.5 dB. Also in accordance with this invention, ball lenses such as illustrated lenses 22R and 22L are employed in the illustrated pin housings 14 and 16 respectively. Such lenses are comprised of hard glass materials normally having a refractive index of less than 2. Because of their hardness, such ball lenses may be more precisely and easily polished and are more resistant to contamination by dirt. Such lenses are also more resistant to the deleterious consequences of being exposed to moisture than ball lenses formed of softer glasses normally having a higher index of refraction.

Further, in accordance with this invention, spacers 24R and 24L are employed in the pin housings 14 and 16 respectively, which are substantially identical in construction. Such spacers are preferably in form of a thin plate as illustrated. The function of these spacers is to render the location of the adjacent terminal ends of the cores 15 of the two fibers 10 and 12 at a precise distance relative to their associated ball lenses 22R and 22L respectively. This precise distance is such that if light emanates from terminal ends 26 of the fibers 10 and 12, it will enter the adjacent ball lens 22R or 22L from its precise focal point. A a result, assuming light passage from fiber 10 to fiber 12, the light emanating from fiber 10 will enter ball lens 22R from its focal point, be transmitted to oppositely disposed ball lens 22L and be refocused on adjacent fiber terminal end 26 of fiber 12 located at the focal point of lens 22L in the manner schematically illustrated by the dotted lines in FIG. 1. In the normal position of contact assembly in an alignment sleeve or other aligning connector construction, the interval between the adjacent convex surfaces of the ball lenses 22R and 22L will be on the order of at least 4 mils, and can range from 0 to 100 mils. This interval may vary as desired if the interval is not so great as to result in appreciable light loss.

It is of critical importance for the purpose of minimizing light losses during transmission, that the axes of the optical fiber cores 15 of the two fibers 10 and 12 be coaxial. Such coaxial relationship is provided by means of precision guides or ferrules 28 disposed within precisely fitting receiving bores 29 in each of the pin housings 14 and 16 as illustrated in FIG. 1. The precision fiber guides 28 have flared ends 34 to facilitate insertion of the ends of the optical fibers to be received within precision passageways 30 formed in the ferrules. These passageways are bored so as to have a diameter precisely equal to the outer diameter of the fibers received therein, and the tolerances are such that the precision bores should be no more than approximately 0.0001 inch greater in diameter than the outer diameter of the cladding cores of the optical fibers 10 and 12.

The precision guides are formed of synthetic jewels such as ruby or sapphire or any other material which will provide the necessary dimensional stability and tolerances. The ball lenses 22R and 22L may be formed of a large variety of glasses, such as for example those manufactured by Schott Optical Glass, Inc. of Duryea, Pa., Corning Glass Works of Corning, N.Y., and Hoya Corp., of Tokyo, Japan. Such glasses should preferably have an index of refraction between 1.8 and 1.5. Two such suitable glasses are known in the art as Schott glasses SF57 and BK7. The ball lenses may also be formed of known materials such as tellurium oxide and zircon.

It will be noted most clearly from FIG. 1 that each of the spacers 24R and 24L have traversing the thickness thereof apertures comprising flared opening portion 40 contiguous with a smaller cylindrical opening portion 42. The cylindrical opening portion 42 in each glass spacer is of such diameter as to prevent entry of the clad distal optical fiber portion terminating at one end thereof flush with inner surface of the spacers 24R, 24L disposed in the opposed pin housings 14 and 16. It will be noted from FIG. 1, however, that the optical fiber cores 16 are of a lesser diameter than the diameter of the cylindrical opening portions 42 in each of the spacers. Accordingly, light emitted from terminal ends 26 of the fibers will traverse the width of the spacers 24R and 24L without passing through any of the glass itself. Accordingly, Fresnel losses are minimized as the light passing from the fiber 10 into the ball lens 22R as well as the light passing from the ball lens 22L into the fiber core 15 of the fiber 12 does not traverse any material of the two spacers 24R and 24L. Thus, the spacers may be formed of transparent material such as glass or non-transparent material such as metal. Light transmission may of course be from fiber 12 to fiber 10 with no change in the connector assemblies illustrated in the drawing.

Figure 2:
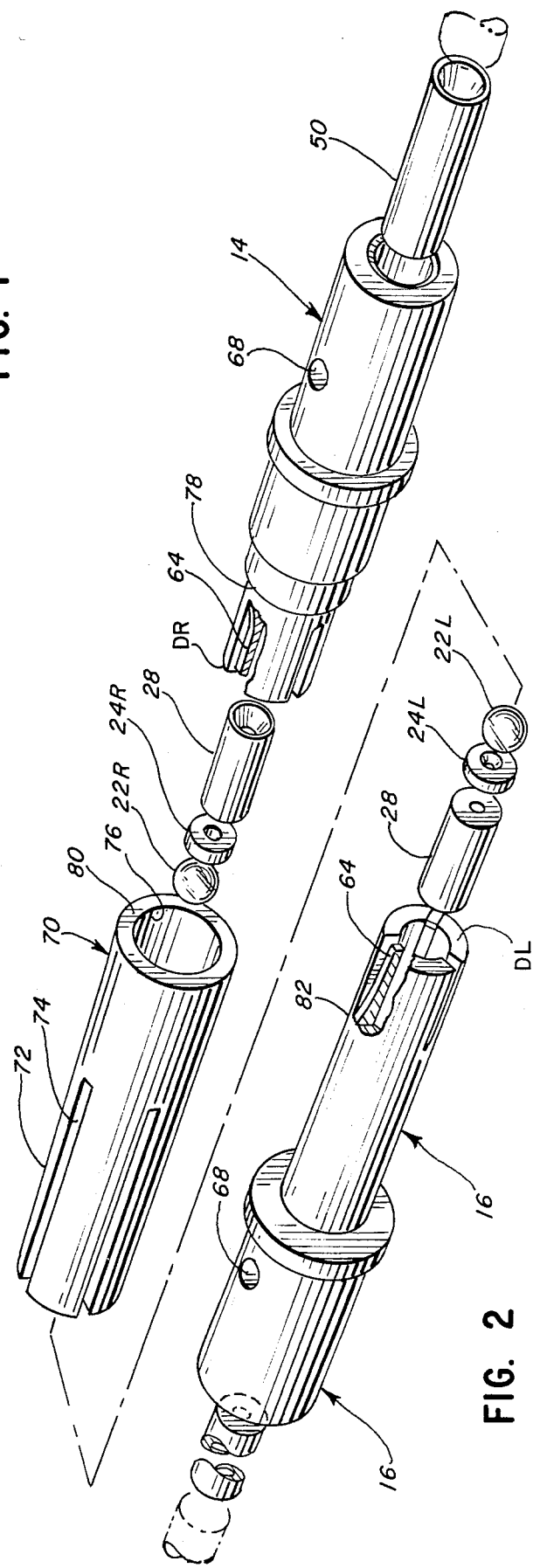
FIG. 2 is an exploded view illustrating elements of the two pin contacts including elements similar to those of FIG. 1 in combination with an interposed alignment sleeve.
Figure 3:
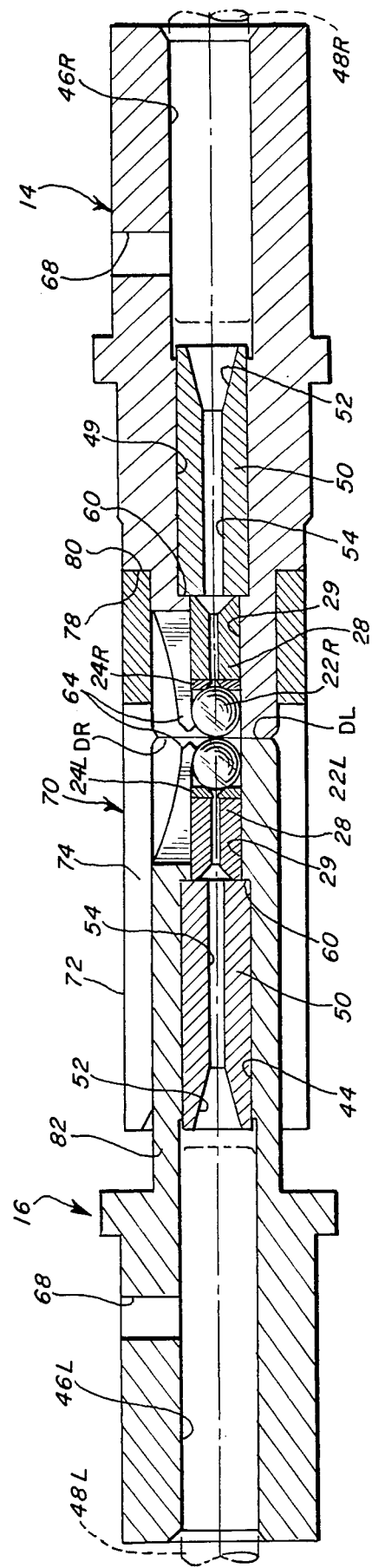
FIG. 3 is a longitudinal sectional view taken on line 3—3 of FIG. 4, and illustrating the elements of FIG. 2 in a normal position of assembly with ball lenses illustrated in elevation.

The entire assemblies of the optical pins P are illustrated in the sectional view of FIG. 3 as well as the exploded view of FIG. 2. It will be noted from FIG. 3 that pin housing 14 has a cylindrical bore or chamber 46R of an appropriate inner diameter so as to snugly receive the plastic-coated or otherwise jacketed optical fiber portion therein. Outer coating 48R of a fiber such as fiber 10 of FIG. 1 is illustrated in dotted lines in FIG. 3. Similarly, contact housing 16 has a bore or passageway 46L for reception of a similar enlarged, cylindrical coated fiber portion 48L in the manner illustrated in FIG. 3.

Positioned between the end of the jacketed portion 48R and 48L of each optical fiber and its adjacent precision guide 28 in a housing bore 49, is a pin liner 50 having a flared end 52 to facilitate entry of the clad fiber core stripped of its outer coating or jacket 48. The flared opening 52 of each liner 50 communicates with a liner longitudinal cylindrical passageway 54 which is of a diameter to precisely receive therein the clad optical fibers 10 and 12 of FIG. 1 from which jackets 48R and 48L have been removed.

The pin liners 50 render it unnecessary to precisely drill out fiber-receiving cylindrical openings similar to passageway 54 in each of the pin housings 14 and 16. Such passageway formation would be a difficult manufacturing task in view of the ultraminiature size of the contact provided. The pin body portion wherein the majority of the liner-receiving bore 49 is formed is normally less than 0.15 inch in diameter, and the diameter of the bore 49 is approximately 0.047 inch in diameter. It is thus seen that the pin liners 50 enable the opposed fibers to be desirably precisely aligned coaxially while at the same time eliminating the necessity of drilling very small openings in the pin bodies. It is intended that the pin liners 50 be press fit into the receiving openings of the pin housings 14 and 16 respectively.

It will be most apparent from FIG. 3 of the drawing that each liner-receiving cylindrical bore 49 terminates in a shoulder 60 which locates each liner relative to the adjacent terminal pin end in which a ball lens is mounted. In the normal course of optical pin assembly, the pin liners 50 are first press fit into their receiving pin bores 49 and against stop shoulders 60 whereby the liners are precisely located within the interior of each pin body. The press fit is effected by outer diameters of the pin liners 50 which are approximately 0.0001 inch greater in diameter than the receiving bores 49 of the pin bodies.

Following location of the pin liners 50 within each of the pin housings 14 and 16, the precise optical fiber guides 28 are inserted into receiving bore portions 29 of each of the pin housings 14 and 16. The flared ends of the precise fiber guides 28 are located by the ends of the pin liners 50 oppositely disposed to flared ends 52 which engage the housing shoulders 60. The spacers 24R and 24L are then inserted into the bores 29 in the manner illustrated in FIG. 3, whereafter the ball lenses 22R and 22L are placed in position over the flared-opening side of the spacer plates in the manner more clearly seen in FIG. 1 of the drawing.

Figure 5:
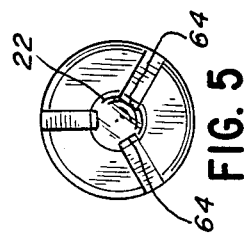
FIG. 5 is an end view of a contact made in accordance with this invention.

Ball-retention fingers 64 cut from longitudinal cylindrical portions of each of the pin housings 14 and 16 are then formed over the ball lenses in the manner illustrated in FIGS. 1 and 3. The fingers taper in thickness toward their ball-engaging distal ends to facilitate deformation and ball lens engagement. The retention fingers are spaced apart 120 degrees in the manner more clearly seen from the end view of FIG. 5. It is noted from FIG. 5 that the fingers 64 comprise a small portion of the periphery of each pin body and, accordingly, the remaining unslotted portions of each pin body function to provide a rigid pin structure which may engage in mutually abutting engagement with the opposed pin in the manner illustrated in FIG. 3. Inasmuch as the pin fingers 64 are formed over each ball lens and as the interval between the shoulder 60 of each pin body and the outer distal peripheral portion of each ball lens is a precise interval, each ball lens will have its outermost peripheral portion disposed inwardly of the distal terminal end of each pin housing 14 and 16 engaged in abutment as illustrated in FIGS. 1 and 3.

It is contemplated in accordance with this invention that the outermost portion of each ball lens be inwardly disposed of the terminal end of each pin body at least 0.002 inch. This interval is not critical as the light passing between ball lenses is collimated for intervals up to about one lens diameter. A lesser interval however minimizes the possibility of misalignment between the pin bodies. Following assembly of the pin liner, precision guide, spacer and ball lens into engagement with its respective pin body in the manner of FIG. 3, an optic fiber having its jacket 48 stripped from the clad fiber end is inserted into flared opening 52 of the pin liner 50 and into the precision guide 28 for engagement with a stop surface of an engaged spacer in the manner more clearly seen in FIG. 1. In such disposition, the plastic coated or jacketed portion 48R and 48L of each optical fiber is received in the enlarged cylindrical passageways 46R and 46L respectively of the pins P, wherein they may be secured in such passageway by means of an adhesive inserted through opening 68 formed in the pin body walls.

As an alternative fiber anchoring means, inasmuch as each pin body wall portion defining the fiber-receiving passageway 46 is of the nature of 0.05 inch in thickness, such wall portions may be crimped inwardly. The crimped walls deform the underlying plastic coating without deleteriously affecting the central glass core. It is further contemplated that a crimping instrument (not illustrated and well known in the art) be heated so as to melt the plastic coating 48R or 48L. The melted coating may thereby be adhesively secured to the deformed portion of the pin bodies defining the crimps.

It is apparent from FIGS. 2 and 3 that the pin housings 14 and 16 are dissimilar in construction, although the bodies may be hermaphroditic if employed with an appropriately formed interconnecting sleeve. The pin housings 14 and 16 are dissimilar for illustrative purposes as they are connected in known connector body construction 20 of FIG. 4 which is adapted to receive dissimilar male and female electrical contacts as well as the pins P described herein.

Interconnecting sleeve 70 of FIG. 2 is seen to comprise a slotted end portion 72 having slots 74 formed therein. In the normal course of assembly, the optical fibers and interior pin elements are assembled in the manner above described and as illustrated in FIG. 3. Pin body 14 is inserted into end 76 of sleeve 70 until stop shoulder 78 of housing 14 strikes the sleeve distal end edge surface 80. The cylindrical body portion 82 of pin pin 16 is then inserted into the slotted cylindrical portion 72 of the alignment sleeve 70 in the manner illustrated in FIG. 3.

The cylindrical portion 82 of pin housing 16 is inserted until distal end DL thereof engages distal end DR of the opposed pin housing 14 in the manner also illustrated in FIG. 3. In the position of FIG. 3, the pin ball lenses 22R and 22L are approximately 0.004 of an inch apart at their closest point. By virtue of the slots 74 formed in cylindrical portion 72 of alignment sleeve 70, the cylindrical bayonet portion 82 of pin housing 16 may engage in a press fit with the receiving sleeve portion. The difference between the outer diameter of the cylindrical portion 82 of pin housing 16, and inner diameter of cylindrical portion 72 of sleeve 70 is approximatel 0.002 of an inch.

Figure 4:
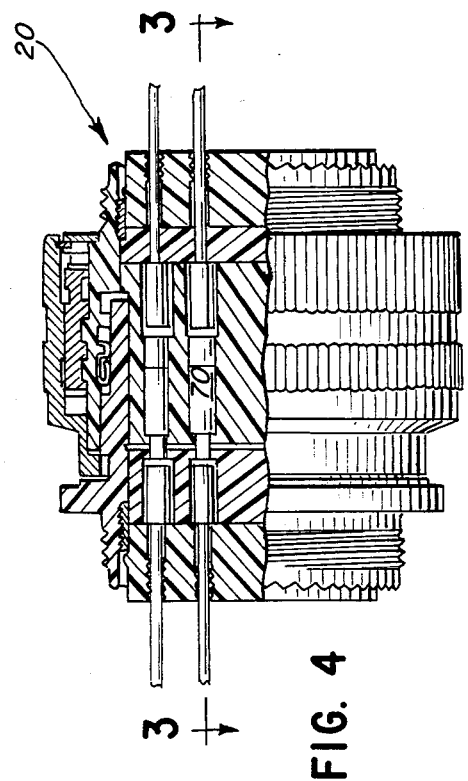
FIG. 4 is a sectional view partly in elevation of a multi-terminus connector in which a plurality of mating optical pin contacts such as are illustrated in FIG. 3 are adapted to be mounted.

FIG. 4 illustrates a multi-terminus connector 20 sold by TRW, Inc., assignee of the subject application, under the tradename Vibralock IV, and comprising a connector identified as MIL C-38999 series IV type connector. The optical pin construction illustrated in FIG. 3 is readily adaptable for utilization in the known connector 20 of FIG. 4 without any alteration of the remaining connector structure which had been used previously for electrical contact interconnection. The optical pin connections of FIG. 3 may be employed in combination with normal electrical interconnections in connectors of the type 20 illustrated in FIG. 4. Therefore such hybrid connectors may simultaneously effect both electrical and optical connections.

As above described, the lensed optical connector pin of this invention is able to provide low cost, expanded beam, fiber optic interconnections with a minimum of light loss, light loss being in the nature of approximately 1.0-1.5 dB. By utilization of the novel combination of elements above described, applicants are able to predeterminately form a construction in which the ball lenses are of a precise diameter and index of refraction, and precisely located relative to the light emitting and receiving ends of optical fibers to have a low-loss light transmissive connection effected therebetween. The provided construction, although affording exceedingly small light losses, assures axial alignment of fiber ends to be connected and, by virtue of the ball lenses employed, minimizes any effect of fiber misalignment.

As the mating fiber ends intended for interconnection by means of the provided contacts are approximately 125 microns in diameter, with cores of fifty microns, the necessity for having proper alignment is made apparent.

It is theoretically possible to employ ball lenses having an index of refraction of 2 exactly. Employing such a material of ball lens formation, an optic fiber end may engage the surface of the ball lens and, accordingly, be at the appropriate focal point thereof.

Inasmuch as the above-described pin contacts do not result in a permanent relationship between the contact ends, the lensed ends may be readily disconnected from their guides such as the illustrated sleeves and cleaned as desired so as to assure optimum light transmission on a continuous basis.

The provided pin constructions are formed of elements which are of relatively low cost to manufacture and, as above indicated, the elements may be assembled in a ready manner. Although ultraminiature in size, the provided optical fiber pins assure desired axial alignment as well as minimal light loss. This is in part made possible by means of the pin liners above noted which obviate any necessity of drilling a fine opening concentrically within a small pin body.

By way of example, an optical pin assembly may comprise a pin housing 16 which may be construed as a male pin for purposes of convenience which is approximately 0.6 of an inch in length. The terminal cylindrical chamber portion for receiving the clad fiber end is approximately 0.039 inch in diameter. The interior bore portion for receiving the pin liner is approximately 0.0468 inch in diameter and the cylindrical bore portion for receiving the plastic coated optical fiber is approximately 0.048 inch in diameter. The comparable bore portions in the pin 14 which for purposes of convenience is referred to as a female pin are of the same magnitude. However, the overall length of pin housing 14 is shorter, being only approximately 0.531 inch in length inasmuch as it is at first located relative to the alignment sleeve 70 by insertion therein, whereafter the male pin portion 16 is inserted in the slotted alignment sleeve end.

In accordance with one embodiment of this invention the alignment sleeve 70 may be approximately 0.35 inch in length. As above noted, any means may be employed for maintaining the longitudinal axes of the contact pin housing 14 and 16 coaxial other than the described alignment sleeve 70. The alignment sleeve may be formed of beryllium copper or other appropriate material. By way of example, employing a ball lens material formed of a Schott glass identified by the designation BK7, having an index of refraction of 1.5 and a ball diameter of approximately 0.04 of an inch the fiber-to-lens spacing should be approximately 0.0095 inch for proper light focussing and minimal light loss. Inasmuch as it is apparent from FIG. 1 that the outermost portion of the ball lens protrudes partially into the flared opening of the spacers 24R and 24L, the spacers are of a thickness of 0.0106 inch so as to provide exactly the fiber-ball lens interval of 0.0095. It is apparent from the foregoing dimensions, therefore, that the ball lens protrudes into the flared opening of the spacer plate approximately 0.0011 inch in the normal position of assembly. The latter entry may serve to center the ball lens center relative to the center of the spacer plate and the optic fiber disposed in the precision guide engaging the exposed face of the spacer.

Although the various pin and sleeve elements are illustrated as being of cylindrical configuration, they may, of course, be of other sectional configurations.

In accordance with this invention if an optical fiber is employed with an adjacent light-receiving ball lens, the end of such fiber is prepared and located in such a way that the emitted light is received by the ball lens and collimated. As a result, light losses due to light cone expansion in the passage from one ball lens to a second ball lens are minimized.

It is believed apparent from the foregoing description that a number of modifications may be made in the provided construction which remain within the ambit of the invention disclosed. Accordingly, this invention is to be limited only by the scope of the appended claims.

What is claimed is:

1. An optical connector comprising a precision fiber alignment guide for locating the end of an optical fiber along a precise longitudinal axis; a ball lens formed of a material having a refractive index of less than 2, one end of said alignment guide having a flat face and being in spaced relation relative to the ball lens whereby the terminal end of an optical fiber disposed in the plane of said alignment guide one end is located at substantially the focal point of said ball lens at the flat face of the alignment guide; spacer plate means having at least one flat face and positioned between the ball lens and said alignment guide for engaging and maintaining the alignment guide one end and said ball lens in said spaced relation, the flat face of the alignment guide abutting the flat face of the spacer plate means, in which said spacer plate means has an opening formed therein for the unobstructed passage of light relative to a terminal end of an optical fiber located in said precision alignment guide.

2. The connector of claim 1 in which said spacer plate means opening widens from the flat face in the direction of said ball lens; a peripheral portion of said ball lens protruding into the said opening and locating the ball lens center in substantial alignment with the center of said spacer means opening.

3. The connector of claim 2 in which the smaller end of said opening in said spacer plate means is substantially circular and coaxial with the central longitudinal axis of said precision fiber alignment guide; said smaller end being of a diameter larger than that of the clad, lightconducting core of an optical fiber adapted to be received in said precision guide, and smaller than the outer diameter of such optical fiber.

4. An optical connector as claimed in olaim 1 wherein the alignment guide is constructed by a jewel material and the spacer plate is constructed selectively of glass or metal.

5. An optical connector as claimed in claim 1 wherein the flat face end of the spacer plate means is adapted to abut against the terminal end of the optical fiber.

6. An optical connector as claimed in claim 1 wherein both faces of the plate are flat and wherein the pin housing includes a terminal end of reduced diameter thereby to secure the ball between the plate face and the terminal end.

7. An optical connector comprising a precision fiber alignment guide for locating the end of an optical fiber along a precise longitudinal axis; a ball lens formed of a material having a refractive index of less than 2; one end of said alignment guide being in spaced relation relative to the ball lens whereby the terminal end of an optical fiber disposed in the plane of said alignment guide one end is located at substantially the focal point of said ball lens; spacer means positioned between the ball lens and said alignment quide for engaging and maintaining the alignment guide one end and said ball lens in said spaced relation, a pin housing for receiving said ball lens and said precision fiber alignment quide; said housing being of a size and configuration to maintain the center of said ball lens substantially coaxial with the precise longitudinal axis of said precision guide, said housing having a first axial bore for receiving said ball lens, said spacer means, and said precision guide; a second axial bore in said housing having a diameter different from said first axial bore and coaxial with said first axial bore; a housing shoulder defining the juncture between said first and second axial bores; a liner for said pin housing having an axial passageway for passage of an optical fiber end disposed in said second axial bore engaging said shoulder at one liner end limit; one end of said precision alignment guide engaging the end of said liner engaging the pin housing shoulder.

8. The connector of claim 7 in which an optical fiber is disposed in the axial passageway of said liner and a contiguous optical fiber portion is received in said precision alignment guide and terminates substantially at the interface between the end of said precision alignment guide engaging said spacer means and said spacer means.

9. The connector of claim 8 in which the optical fiber portion disposed in said liner is contiguous with an optical fiber portion having a protective covering thereover, and an outer peripheral wall portion of said housing is crimped into engagement with said protective covering of said optical fiber.

10. The connector of claim 9 in which said protective covering is plastic and heat is applied in the course of crimping the housing peripheral wall portion, whereby said covering of said optical fiber is melted and interlocks with the deformed housing portion.

11. The connector of claim 8 in which the optical fiber portion disposed in said liner is contiguous with an optical fiber portion having a protective covering thereover and an opening is in the pin housing periphery surrounding the optical fiber portion having the protective covering thereover, for admission of an adhesive for securing the protective covering of said optical fiber in place to an inner portion of the pin housing.

12. The connector of claim 7 in which portions of the housing in which said ball lens is disposed are formed over peripheral portions of said ball lens for retaining said ball lens in said housing first axial bore in abutting engagement with said spacer means.

13. The connector of claim 7 in combination with an alignment sleeve having an aligning bore for receiving and axially aligning said connector housing; said connector housing having an outer peripheral stop shoulder for engaging a first receiving end of said sleeve defining said aligning bore and limiting entry of said connector housing into said aligning sleeve.

14. The connector of claim 13 in combination with a second optical connector housing received in a second receiving end of the aligning bore of said aligning sleeve; the ends of said connector housings having substantially identical ball lenses mounted therein and engaging in a butt contact; the ball lenses being spaced apart an interval comprising a fraction of the diameter of said ball lenses with said housings in abutting engagement.

15. A connector body having a plurality of passageways disposed therein in which a plurality of aligning sleeves are mounted for reception of a plurality of abutting connector housings of claim 14 for effecting a plurality of light transmissive connections.

16. The connector body of claim 15 in which a plurality of electrical connections are effected in some aligning sleeves mounted in said connector body simultaneously with said light transmissive connections effected in other of said aligning sleeves.

17. The connector in claim 7 in which said spacer means has an opening formed therein for the unobstructed passage of light relative to a terminal end of an optical fiber located in said precise guide.

18. The connector of claim 17 in which said spacer means opening widens in the direction of said ball lens; a peripheral portion of said ball lens protruding into the said opening and locating the ball lens center in substantial alignment with the center of said spacer means opening.

19. The connector of claim 18 in which the smaller end of said opening in said spacer means is substantially circular and coaxial with the central longitudinal axis of said precision fiber alignment guide; said smaller end being of a diameter larger than that of the clad, light-conducting core of an optical fiber adapted to be received in said precision guide, and smaller than the outer diameter of such optical fiber.

20. An optical connector comprising a pair of optical connector pins; each of said pins having a housing with a precision fiber alignment guide located within said housing for positioning the end of an optical fiber along a precise longitudinal axis; the guide end having a flat face in alignment with the end of the optical fiber; a ball lens formed of a material having a refractive index of less than 2 and positioned in an end portion of said housing; the flat face end of said alignment guide being in spaced relation relative to the ball lens whereby the terminal end of an optical fiber disposed in the plane of said alignment guide one end is located at substantially the focal point of said ball lens; spacer plate means positioned between the ball lens and said alignment guide for engaging and maintaining the alignment guide flat face end and said ball lens in said spaced relation, said spacer plate means having a flat face for abutment against the flat face end of the alignment guide; said spacer plate means, alignment guide, and ball lens being received within said housings in concentric axial alignment; means in said pin housing for locating said precise alignment guide relative to the opposed ends of said housing; means maintaining said ball lens, spacer plate means, and alignment guide in a state of assembly; and alignment sleeve means for slidably receiving two optical connector pins with the pin ends in which said ball lenses are located in abutting engagement whereby said pins are maintained in concentric axial alignment.

21. The optical connector of claim 17 in which said pin housings, spacer means, and precision fiber alignment guides are of generally cylindrical configuration and each precision alignment guide is located at a precise interval relative to the end of the pin housing in which said ball lens is disposed.

22. The optical connector of claim 17 in which each spacer means is centrally apertured for passage of light and is formed of a non-transparent material.

23. A method of forming an optical connector comprising the steps of forming ball lenses of uniform diameter from a material having a refractive index of less than two; determining the interval between the center of the ball lens and the lens focal point; locating a optical fiber end in a precision fiber alignment guide; forming spacers with a flat face and of such configuration and size so as to abut a ball lens and optical fiber end on opposed surface portions and locate the optical fiber end substantially at the focal point of the ball lens when the center of said ball lens and the optic fiber central axis are axially aligned, abutting the optical fiber end and a flat face of an end of the fiber alignment guide, and mounting the ball lens, spacer and optical fiber end in a housing in abutting engagement in said axial alignment.

* * * * *

UNITED STATES PATENT AND TRADEMARK OFFICE
CERTIFICATE OF CORRECTION

PATENT NO. : 4,781,431

DATED : November 1, 1988

INVENTOR(S) : Lawrence N. Wesson and James F. Ryley

It is certified that error appears in the above-identified patent and that said Letters Patent is hereby corrected as shown below:

```
Col.  2, line 24, "fiberguiding" should be --fiber-guiding--
Col.  2, line 24, "furrule" should be --ferrule--
Col.  4, lines 41 and 42, "shoulderengaging" should be --shoulder
      -engaging--
Col.  6, line 7, "A" should be --As--
Col.  9, line 3, "pin" should be deleted
Col. 10, line 26, "housing" should be --housings--
Col. 11, line 28, "olaim" should be --claim--
Col. 14, line 4, "17" should be --20--
Col. 14, line 10, "17" should be --20--
```

Signed and Sealed this

Fourteenth Day of January, 1992

*Attest:*

HARRY F. MANBECK, JR.

*Attesting Officer*     *Commissioner of Patents and Trademarks*